(12) United States Patent
Iihoshi et al.

(10) Patent No.: US 10,902,730 B2
(45) Date of Patent: Jan. 26, 2021

(54) VEHICLE CONTROL DEVICE

(71) Applicant: HITACHI AUTOMOTIVE SYSTEMS, LTD., Hitachinaka (JP)

(72) Inventors: Yoichi Iihoshi, Tokyo (JP); Koichi Terui, Tokyo (JP); Yuichi Komoriya, Tokyo (JP); Yuuki Okuda, Tokyo (JP); Yuto Imanishi, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/622,694

(22) PCT Filed: Jun. 20, 2018

(86) PCT No.: PCT/JP2018/023393
§ 371 (c)(1),
(2) Date: Dec. 13, 2019

(87) PCT Pub. No.: WO2019/009067
PCT Pub. Date: Jan. 10, 2019

(65) Prior Publication Data
US 2020/0118442 A1    Apr. 16, 2020

(30) Foreign Application Priority Data

Jul. 3, 2017 (JP) .................................. 2017-130250

(51) Int. Cl.
*G08G 1/16* (2006.01)
*B60W 30/095* (2012.01)
(Continued)

(52) U.S. Cl.
CPC .......... *G08G 1/167* (2013.01); *B60W 30/0956* (2013.01); *B60W 30/10* (2013.01);
(Continued)

(58) Field of Classification Search
CPC ....... B60W 30/18163; B60W 2520/10; B60W 50/14; B60W 2554/804; B60W 2420/42;
(Continued)

(56) References Cited

U.S. PATENT DOCUMENTS

2003/0109980 A1*  6/2003  Kojima ................. G08G 1/166
                                                                 701/96
2010/0030474 A1   2/2010  Sawada
(Continued)

FOREIGN PATENT DOCUMENTS

JP    2003-170760 A    6/2003
JP    2006-113918 A    4/2006
(Continued)

OTHER PUBLICATIONS

International Search Report with English translation and Written Opinion issued in corresponding application No. PCT/JP2018/023393 dated Oct. 9, 2018.

*Primary Examiner* — Daniel Previl
(74) *Attorney, Agent, or Firm* — Foley & Lardner LLP

(57) ABSTRACT

Provided is a vehicle control device capable of reducing unease experienced by a driver and assisting a lane change of a vehicle. A vehicle control device 10 assists a lane change of a vehicle 1, said device comprising: a visible range calculation unit 11 that calculates an area as a visible range by excluding the area occupied by preceding vehicles 201, 202 from the area corresponding to the field of vision whilst driving; and a lane-change control unit 12 that conducts processing related to the lane change, on the basis of the calculated visible range. The lane-change control unit 12 conducts processing related to the lane change on the basis of the visible range of the current-travel lane of the vehicle, and the visible range of the intended change-destination lane of the vehicle.

12 Claims, 9 Drawing Sheets

(51) Int. Cl.
*B60W 30/10* (2006.01)
*B60W 40/04* (2006.01)
*B60W 50/14* (2020.01)
*B62D 6/00* (2006.01)

(52) U.S. Cl.
CPC .......... *B60W 40/04* (2013.01); *B60W 50/14* (2013.01); *B62D 6/00* (2013.01); *B60W 2520/10* (2013.01); *B60W 2554/801* (2020.02); *B60W 2554/804* (2020.02)

(58) Field of Classification Search
CPC ........... B60W 2554/801; B60W 30/10; B60W 10/04; B60W 10/20; B60W 2050/146; B60W 2554/00; B60W 30/095; B60W 30/0956; B60W 40/04; B60W 2710/20; B60W 30/14; B60W 10/06; B60W 10/10; B60W 10/18; B60W 2520/06; B60W 2540/215; B60W 2552/00; B60W 2552/30; B60W 2554/20; B60W 2554/4041; B60W 2554/80; B60W 2554/803; B60W 2556/50; B60W 2556/55; B60W 2556/65; B60W 2710/205; B60W 2720/10; B60W 30/06; B60W 30/12; B60W 30/143; B60W 40/114; B60W 50/085; B60W 50/12; B60W 50/16; B60W 2400/00; B60W 2420/52; B60W 2556/00; B60W 2720/106; B60W 60/001; G08G 1/167; G08G 1/16; B62D 15/0255; B62D 6/00; B62D 15/025; B62D 15/027; B62D 15/0285; B60R 21/00; G05D 1/021; G05D 2201/0213; G05D 1/0088; G05D 1/0246; G05D 1/0223; G05D 1/0253; G05D 1/0257; B60K 2370/152; B60K 2370/175; B60K 2370/193; B60K 31/0008; B60K 35/00; B60K 31/00; G01C 21/34; G01C 21/3602; G01C 21/3658; B60T 2201/089; B60T 2210/36; B60T 7/12
USPC .... 340/435, 436, 425.5, 901–903, 933, 907, 340/909–910, 936, 941, 438, 459, 461, 340/439
See application file for complete search history.

(56) References Cited

U.S. PATENT DOCUMENTS

| | | | | |
|---|---|---|---|---|
| 2010/0253542 | A1* | 10/2010 | Seder | G01S 13/931 340/932.2 |
| 2010/0253595 | A1* | 10/2010 | Szczerba | G01S 13/931 345/7 |
| 2010/0253597 | A1* | 10/2010 | Seder | G08G 1/165 345/7 |
| 2010/0253918 | A1* | 10/2010 | Seder | G08G 1/165 353/13 |
| 2010/0292886 | A1* | 11/2010 | Szczerba | G01S 13/723 701/31.4 |
| 2016/0355178 | A1* | 12/2016 | Shiraishi | B62D 15/0285 |

FOREIGN PATENT DOCUMENTS

| | | |
|---|---|---|
| JP | 2010-030513 A | 2/2010 |
| JP | 2012-174209 A | 9/2012 |
| WO | WO-2015/045112 A1 | 4/2015 |

\* cited by examiner

VEHICLE CONTROL DEVICE

TECHNICAL FIELD

The present invention relates to a vehicle control device.

BACKGROUND ART

Development of technologies to assist driver operations, such as technology to follow preceding vehicles and technology to automatically change lanes, and development of automated driving technology for automated driver operations are in progress. In these technologies, a vehicle control device recognizes the surrounding environment on the basis of sensing information obtained from an in-vehicle camera, a radar, or the like, and operates a power train, a brake, and a steering wheel in behalf of the driver.

During the driving of the vehicle by the vehicle control device in behalf of the driver, a technique for automatically avoiding an invisible obstacle (PTL 1) and a technique for assisting steering according to a curving situation (PTL 2) are also known as techniques for reducing uncomfortable feelings given to the driver.

CITATION LIST

Patent Literature

PTL 1: JP 2010-30513 A
PTL 2: JP 2003-170760 A

SUMMARY OF INVENTION

Technical Problem

In the above-described prior art technologies, sufficient consideration has not been given to visual information that accounts for a large proportion of the psychological factors of the driver. Specifically, in the prior art technologies, when the field of vision of the driver is largely blocked by a large vehicle in front, the driver would be uneasy in driving, but how to eliminate such uneasiness has not been considered well.

For this reason, the prior art technologies automatically perform a lane change or tracking of the preceding vehicle whenever possible, even when the field of vision of the driver is or presumably blocked largely. The driver, however, may override or cancel the automatic driving or the driving assist control to secure the field of vision, so that the effects of the automatic driving technology or the driving assist technology may not be fully provided.

The present invention has been made in view of the above problems, and it is an object of the present invention to provide a vehicle control device capable of reducing uneasiness of a driver and assisting a lane change of the vehicle. Another object of the present invention is to provide a vehicle control device capable of reducing uneasiness of a driver and enabling a lane change by securing the field of vision of the driver according to driving situations.

Solution to Problem

To solve the above problems, a vehicle control device according to the present invention is a vehicle control device capable of assisting a lane change of a vehicle, the vehicle control device including a visible range calculation unit that calculates an area as a visible area by excluding an area occupied by a preceding vehicle from an area corresponding to a field of vision during driving, and a lane-change control unit that executes processing related to lane change in accordance with the calculated visible range, in which the lane-change control unit executes the processing related to the lane change of a current-travel lane and the visible range of an intended change-destination lane.

Advantageous Effects of Invention

According to the present invention, the processing related to the lane change can be carried out on the basis of the visible range of the current-travel lane and the visible range of the intended change-destination lane, whereby the lane change can be assisted, while the uneasiness of the driver caused through visual information is decreased.

DESCRIPTION OF EMBODIMENTS

Embodiments of the present invention will be described below by referring to the accompanying drawings. A vehicle control device 10 according to the present embodiment assists lane change to secure the field of vision during driving as large as possible, as will be described later.

The present embodiment includes a visible range calculation unit 11 that calculates a visible range corresponding to the field of vision of a driver driving a vehicle 1, and a target trajectory calculation unit 12 serving as a "lane-change control unit" that determines the lane change on the basis of the visible range. The visible range calculation unit 11 calculates a visible range V1 on the current-travel lane. Further, the visible range calculation unit 11 calculates a visible range V3 when the vehicle 1 changes lanes. The target trajectory calculation unit 12 provides the driver with information on the lane change of the vehicle 1 on the basis of the visible range V1 and the visible range V3.

According to the present embodiment, it is possible to assist the lane change while securing the field of vision of the driver as wide as possible, reduce uneasiness of the driver, and improve usability.

First Embodiment

Figure 1:
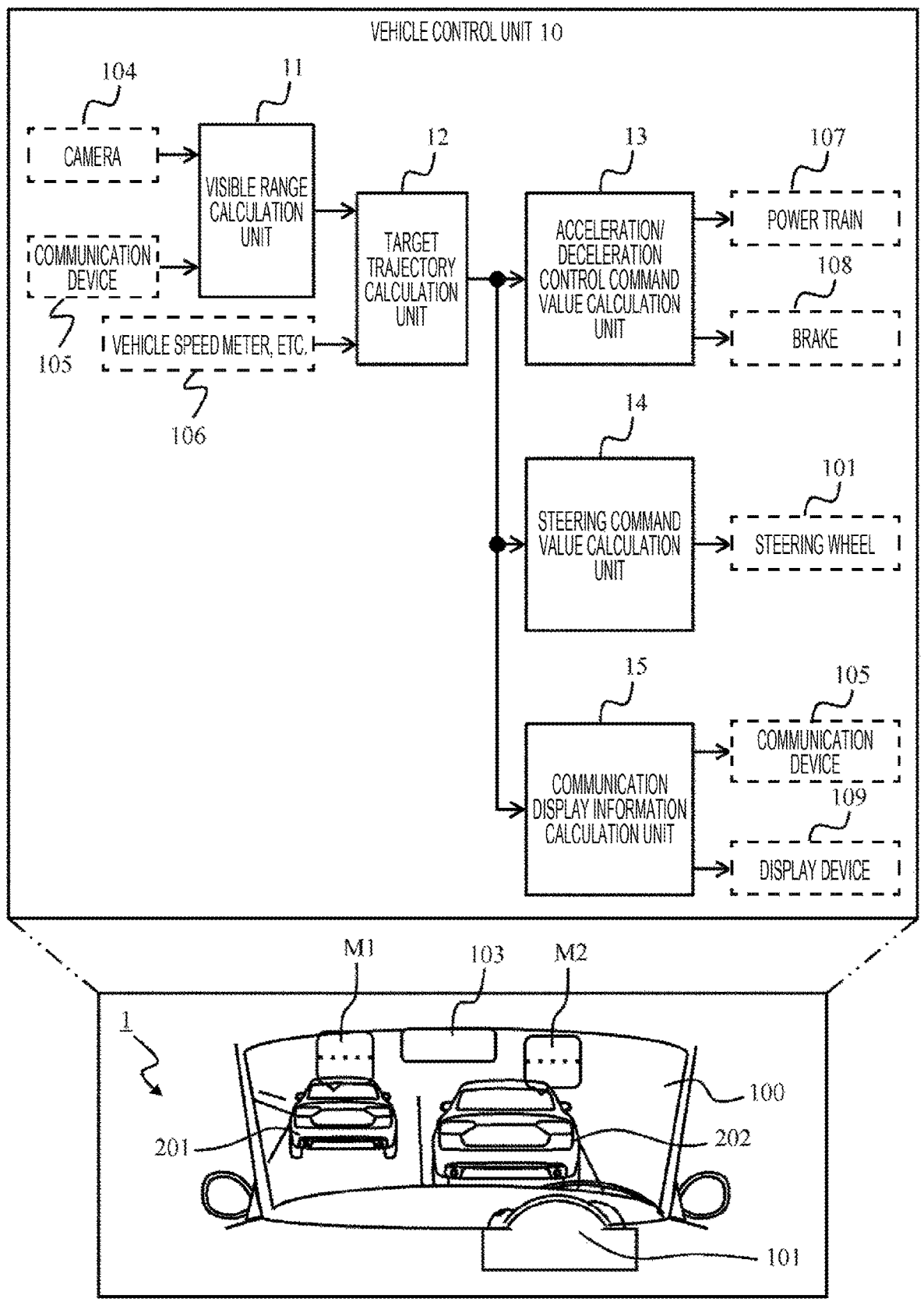
FIG. 1 is a functional block diagram illustrating an entire configuration of a vehicle control device.

An embodiment will be described with reference to FIGS. 1 to 10. FIG. 1 is a functional block diagram illustrating the overall configuration of the vehicle control device 10.

As illustrated on the lower side of FIG. 1, a vehicle (which may also be referred to as an own vehicle hereinafter) 1 includes, in a cab, a windshield 100, a steering wheel 101, and a room mirror 103.

The vehicle control device 10 is provided in the vehicle 1, and is configured as a computer system including, for example, a microcomputer, a memory, an input/output interface circuit (all of which are not illustrated), and the like. In terms of the function of the vehicle control device 1, the vehicle control device 1 includes, for example, a visible range calculation unit 11, a target trajectory calculation unit 12, an acceleration/deceleration control command value calculation unit 13, a steering command value calculation unit 14, and a communication display information calculation unit 15. In the vehicle control device 10 illustrated on the upper side of FIG. 1, the elements indicated by dotted lines are not provided in the vehicle control device 10, but connected to the vehicle control device 10.

The visible range calculation unit 11 is a function for calculating a visible range corresponding to the field of vision of a driver. The visible range calculation unit 11 can calculate a plurality of visible ranges on the basis of image data acquired from a camera 104 installed in the vehicle 1 and/or information on the surrounding traffic environment acquired from the communication device 105. The types of visible range will be described later with reference to FIG. 3.

The information on the traffic environment is, for example, information on preceding vehicles including positions, speed, traveling directions, and the like of the preceding vehicles. The information on the traffic environment can be obtained by direct communication between the preceding vehicle and the own vehicle (i.e., inter-vehicle communication), or by communication between an information management center and the own vehicle via a roadside unit (i.e., road-to-vehicle communication).

The target trajectory calculation unit 12 calculates a target trajectory that the own vehicle 1 should travel in order to change lanes by comparing a psychological limit value as a "predetermined reference value set in advance" with a visible range. In other words, the target trajectory calculation unit 12 calculates the target trajectory of the own vehicle 1 so that the visible range is larger than the psychological limit value on the basis of the visible range calculated by the visible range calculation unit 11 and a signal from a vehicle speedo meter 106 or the like.

The acceleration/deceleration control command value calculation unit 13 calculates a command value to be sent to a power train 107, a brake device 108, and the like on the basis of the target trajectory calculated by the target trajectory calculation unit 12. This command value is a command value for controlling acceleration or deceleration.

The steering command value calculation unit 14 calculates a command value to be sent to the steering wheel 101 on the basis of the target trajectory calculated by the target trajectory calculation unit 12. This command value is a command value for controlling the steering angle of the steering wheel 101.

The communication display information calculation unit 15 is a function for presenting the driver with predetermined information as an example of "processing related to the lane change". The predetermined information is, for example, information for allowing the lane change of the own vehicle 1 from the current-travel lane to an intended change-destination lane. When the vehicle control device 10 functions in the driving assist mode, the predetermined information includes, for example, information for prompting steering (target trajectory), and the information is displayed on a display device 109 that is visible to the driver.

In the example illustrated on the lower side of FIG. 1, a plurality of preceding vehicles 201 and 202 can be seen through the windshield 100. Predetermined information M1, M2 corresponding to the preceding vehicles 201, 202, respectively, is projected on the windshield 100 by the display device 109. The predetermined information M1 is information on the preceding vehicle 201. The predetermined information M2 is information on the other preceding vehicle 202. The predetermined information M1, M2 is displayed in such a manner that, for example, "vehicle type=passenger vehicle, distance=5 m, relative speed=0.1 m/s", "vehicle type=bike, distance=10 m, relative speed=2 m/s", or "vehicle type=large vehicle, distance 15 m, relative speed=−0.3 m/s".

The distance and relative speed with respect to the preceding vehicles 201 and 202 can be obtained from, for example, a detection signal of a radar sensor or sonar mounted on the own vehicle 1 or an analysis result of image data captured by the camera 104. The speed of the preceding vehicles 201 and 202 may be acquired from the preceding vehicles 201 and 202 via the communication device 105.

When the vehicle control device 10 functions in an automatic driving mode, the predetermined information includes a control command value for a steering angle and a control command value for acceleration/deceleration, and these control command values are displayed on the display device 109 that can be viewed by the driver.

The display device 109 may be, for example, a head-up display (front glass display) that projects an image on the windshield 100, or a display device that is provided separately from the windshield 100. Information may be provided to the driver using another display form that can be detected by the driver, such as voice or vibration, instead of or along with the display device 109.

Note that information on the traveling state of the own vehicle 1 can also be notified to other vehicles nearby or the roadside unit connected to the information management center via the communication device 105. The information on the traveling state of the own vehicle 1 includes, for example, information indicating the type of information, i.e., the driving assist mode or the automatic driving mode, and information related to future traveling. Information on the future travel can include, for example, a target speed, target acceleration, target steering angle, target steering angular acceleration, and the like, of the own vehicle 1.

Figure 2:
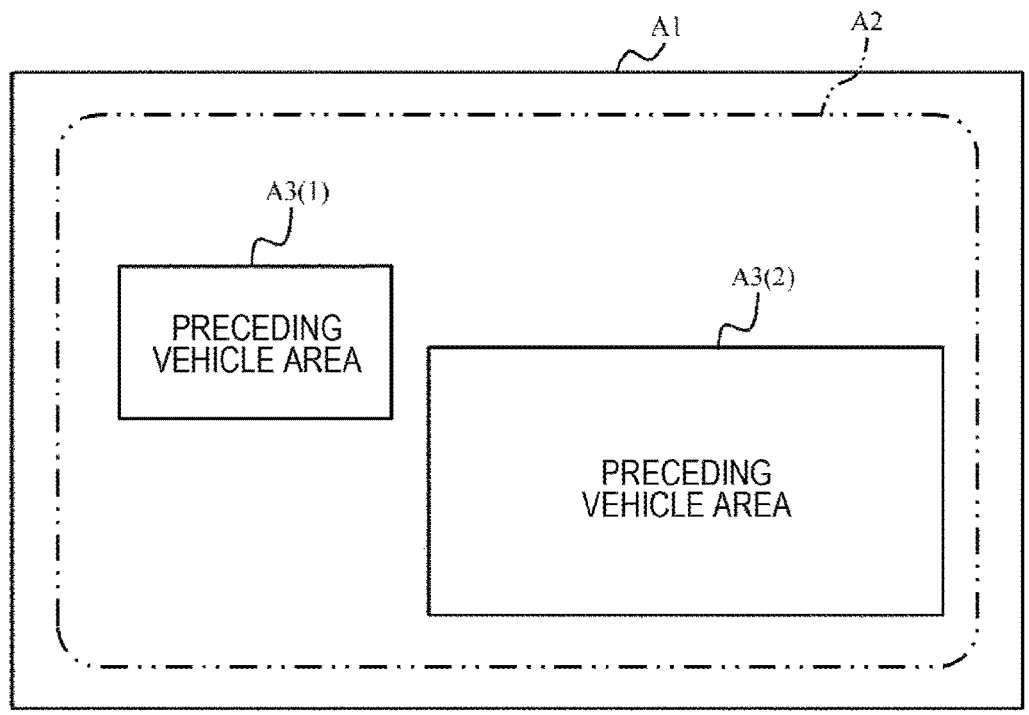
FIG. 2 illustrates a range captured by a camera and a visible range viewed by a driver.

A method of calculating the visible range is described with reference to FIG. 2. An area A1 is an area photographed by the camera 104. An area A2 is an area corresponding to the field of vision of the driver. Areas A3(1) and A3(2) are areas corresponding to the preceding vehicles 201 and 202, respectively, which will be referred to as the area A3 unless otherwise distinguished.

The visible range calculation unit 11 extracts the area A2 corresponding to the field of vision of the driver from the image taken by the camera 104 (or the image ahead of the own vehicle 1) A1. The area A2 corresponding to the field of vision of the driver is an area where the driver is considered to watch while driving. The relationship between the area A1 and the area A2 can be obtained in advance by simulation processing or through experiment. When a sensor for detecting a line of sight of the driver is provided in the cab, the area A2 corresponding to the field of vision of the driver may be extracted from the movement of the line of sight of the driver.

The visible range calculation unit 11 calculates an area, as the visible range V, by excluding the area A3 that becomes invisible due to the projection area of the preceding vehicle in the area A2 corresponding to the field of vision of the driver (a sum of V=A2−A3).

The outer frame of the area A2 corresponding to the field of vision of the driver may be, with setting the travel direction of the own vehicle 1 as a center, extracted from the area A1 taken by the camera 104 in such a manner that the faster the speed of the own vehicle 1 becomes, the farther the area can be extracted from the area A1 taken by the camera 104. This allows setting of the field of vision A2 according to the speed of the own vehicle, and improves safety of driving assistance or automatic driving.

Further, the size of the area A2 corresponding to the field of vision of the driver can be adjusted according to the weather (rain, snow, ash fall, dust, and the like) and brightness (day, night, cloudy, clear, and the like). In other words, for example, in case of raining or snowing, the size of the area A2 corresponding to the field of vision is made smaller than that in fine weather, while in fine weather, the size of the area A2 is made smaller at night than in the daytime to make the area A2 closer to the vision of the driver.

The visible range calculation unit 11 of the present embodiment calculates the visible range V from the area A2 set as described above, and the target trajectory calculation unit 12 performs lane change control on the basis of the visible range V. Specifically, the target trajectory calculation unit 12 suppresses narrowing of the visible range V, which is the area corresponding to the actual field of vision of the driver, to be smaller than a psychological limit value as a predetermined value, thus performing the vehicle change control while preventing the narrowing of the field of vision of the driver.

Figure 3:
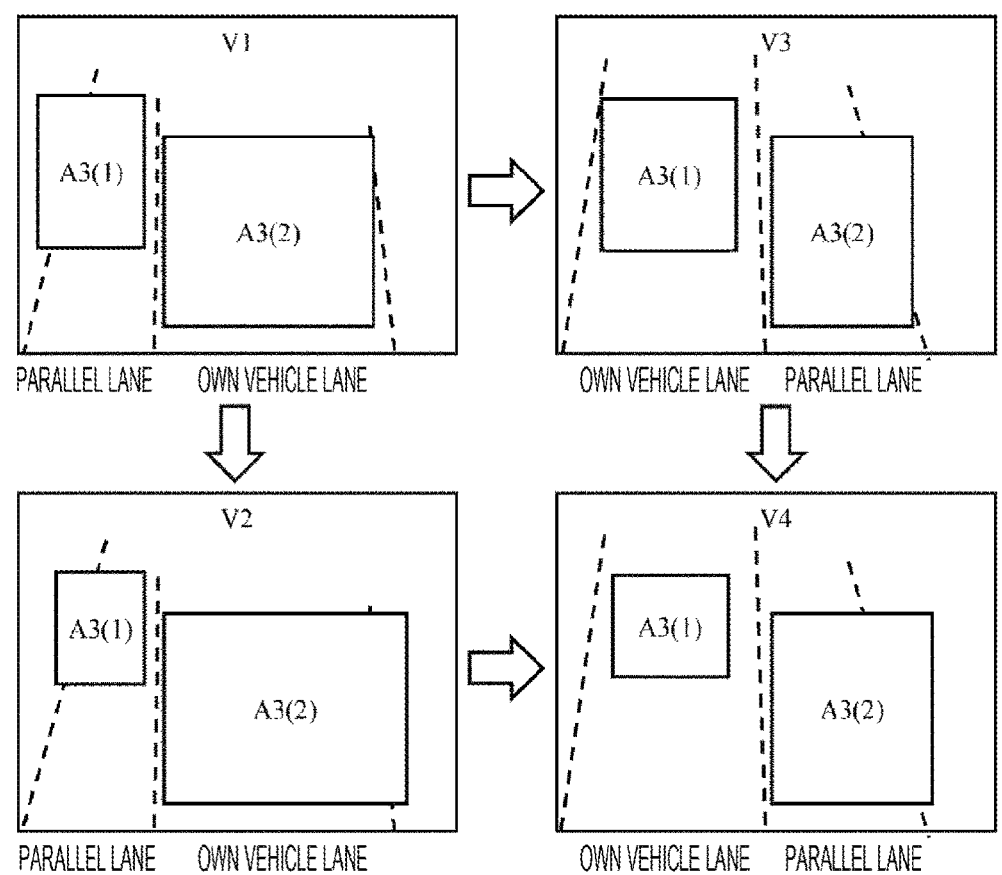
FIG. 3 is an explanatory diagram illustrating a relationship between current and future visible ranges of a current-travel lane and current and future visible ranges of an intended change-destination lane (parallel lane).

FIG. 3 is an explanatory diagram illustrating the relationship between a plurality of visible ranges V. Here, a four-lane road (two lanes on each way) is described as an example. In FIG. 3, an upper-left diagram illustrates the current visible range V1 of the own vehicle 1. The method of calculating the current visible range V1 is as described in FIG. 2.

A diagram below the diagram of the current visible range V1 illustrates a visible range V2 (predicted value) after predetermined time has passed when the own vehicle 1 continues to travel on the current lane.

A diagram on the right of the current visible range V1 illustrates a visible range V3 when the viewpoint is switched to the lane running parallel to the current-travel lane. Since the example described here is the four-lane road (two lanes on each way), the lane running parallel to the current-travel lane is an example of an "intended change-destination lane". In a case of a six-lane road (three lanes on each way), assuming that the own vehicle 1 is traveling on the middle lane, the intended change-destination lane should be either the left-side parallel lane or the right-side parallel lane. Note that, hereinafter, the parallel lane will be referred to as an adjacent lane.

By processing the image data captured by the camera 104, the image area A1 can be obtained when the own vehicle 1 moves to a parallel lane, and the visible range V3 can be calculated from the camera image area A1. In other words, the visible range V3 is a predicted value indicating the field of vision corresponding to that of the driver when the own vehicle 1 quickly changes to a parallel lane.

A diagram below the visible range V3 after the lane change illustrates the visible range V4 obtained after the predetermined time in a case where the lane is changed.

Figure 4:
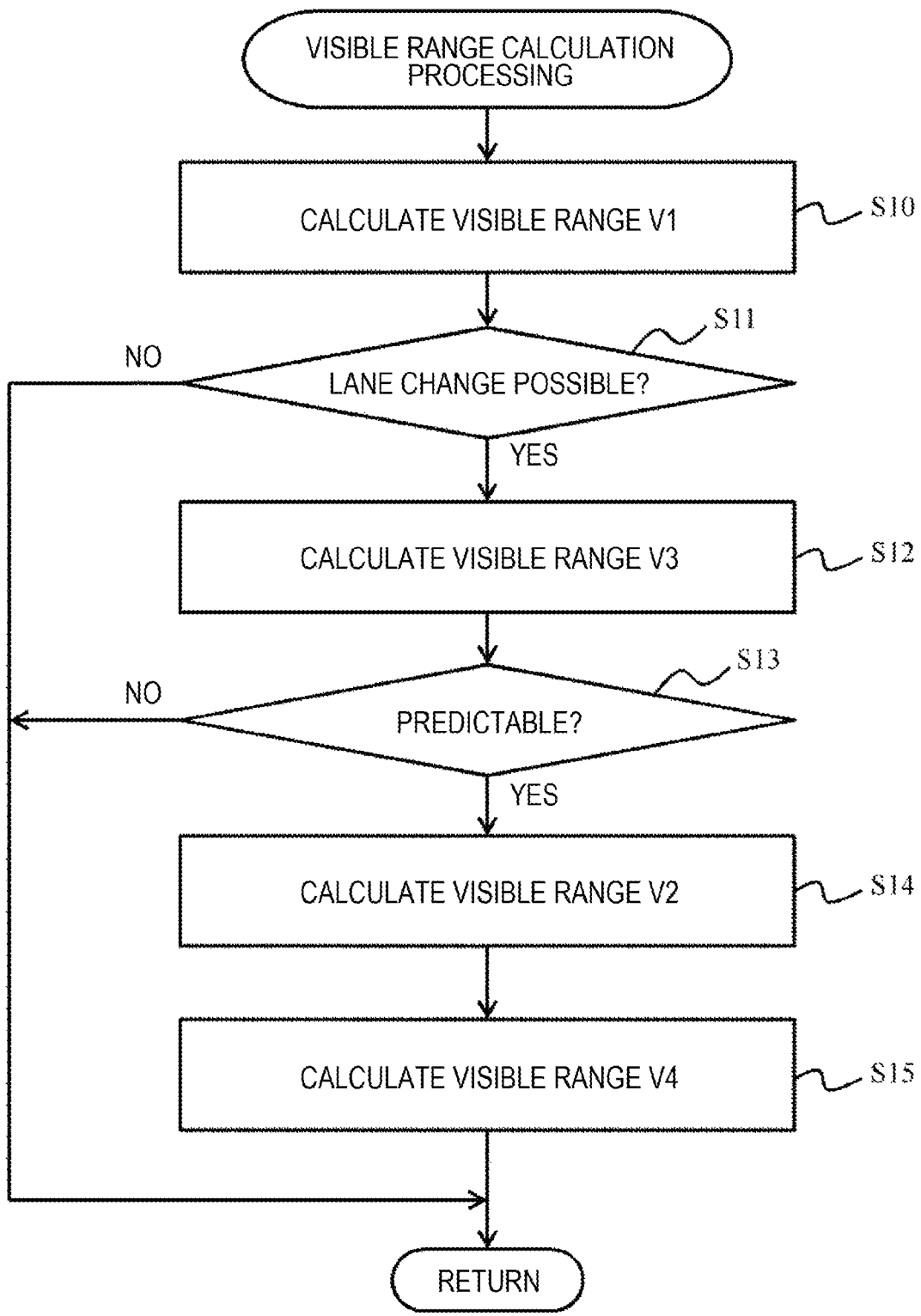
FIG. 4 is a flowchart illustrating processing for calculating a visible range.
Figure 5:
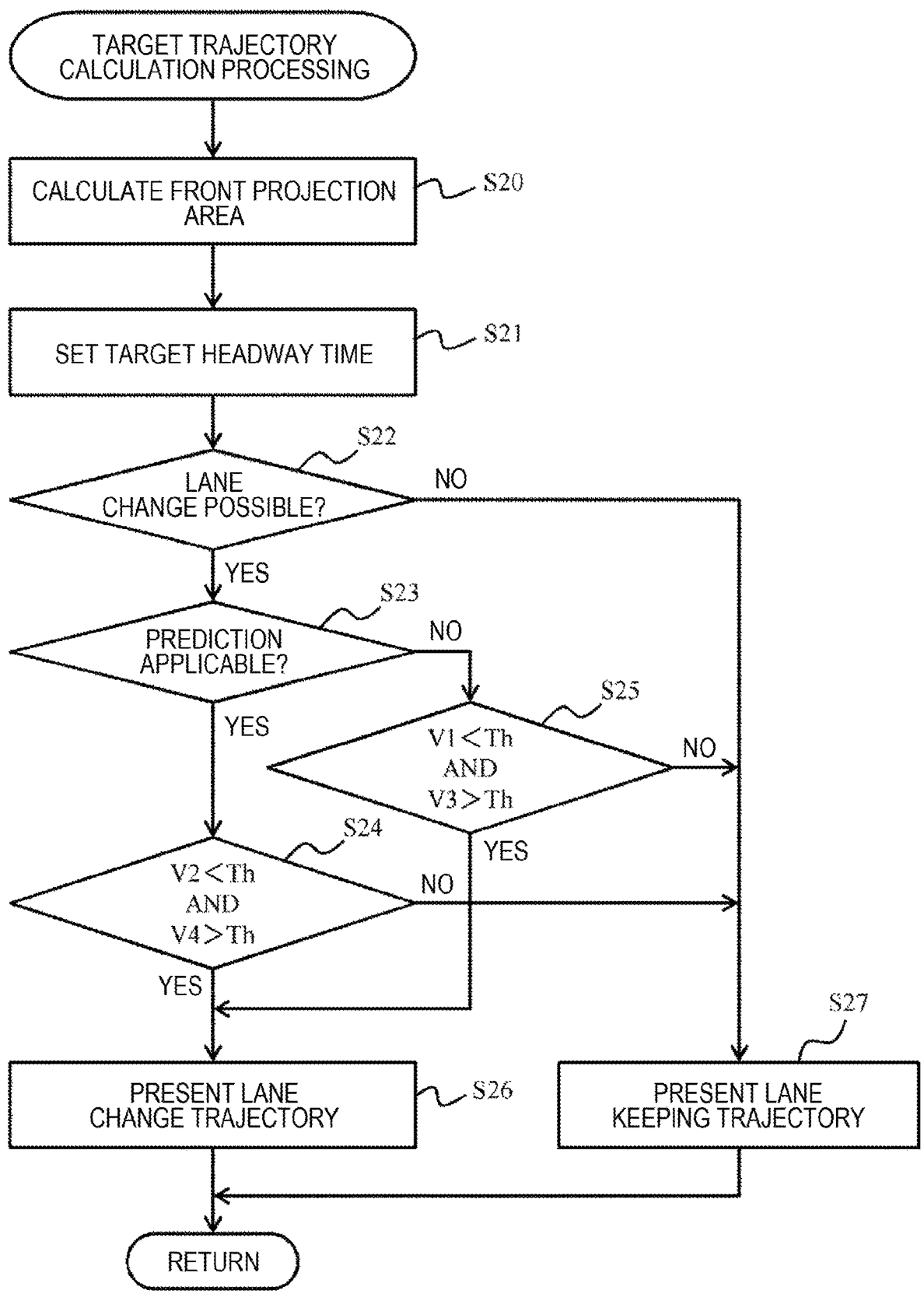
FIG. 5 is a flowchart illustrating processing for calculating a target trajectory in a lane change.

FIG. 4 is a flowchart illustrating processing of calculating the visible range V. First, the visible range calculation unit 11 calculates the current visible range V1, that is, the visible range V1 on the current-travel lane of the own vehicle 1 (S10).

Subsequently, the visible range calculation unit 11 determines whether the lane change is possible (S11). For example, it is determined whether there is an empty space wide enough to advance the own vehicle 1 to the adjacent lane by analyzing the image data of the camera 104 or the signal of the radar sensor and, if the presence of the empty space is determined, it is determined that the lane change is possible. Further, it is also possible to determine that the lane change is possible if it is predicted that the vehicle can travel at least for a certain period of time after the lane change without being forced to change lane again immediately.

Upon determination that the lane change is possible (S11: YES), the visible range calculation unit 11 predicts the visible range V3 in the case where the own vehicle 1 changes the lane now (S12). For example, the visible range calculation unit 11 detects the white lines on both sides of the own vehicle 1 after the lane change in the image data of the monocular camera, and converts coordinates so that the white lines on both sides converge from both sides toward a vanishing point. Note that the image conversion causes distortion, but in the case of a stereo camera, the distortion can be reduced by using the cameras each being closer to the left or right lane. When a stereo camera is used, the distance from the own vehicle 1 to the preceding vehicle and the size of the preceding vehicle can be calculated simultaneously, so that the viewpoint conversion processing of the preceding vehicle area A3 is more easily performed.

If it is determined that the lane change is not possible (S11: NO), this processing is terminated and the process returns to the main flow (not illustrated).

After executing step S12, the visible range calculation unit 11 determines whether it is possible to predict the visible ranges V2 and V4 after the predetermined time on the current lane and the intended change-destination lane (parallel adjacent lane) (S13). For example, if the inter-vehicle distance and relative speed between the own vehicle 1 and the preceding vehicle are obtained, and the own vehicle 1 is under control in the driving assist mode or the automatic driving mode, it is determined that the visible range after the predetermined time is predictable.

If it is determined to be predictable (S13: YES), the visible range V2 after the predetermined time in the case of no lane change is predicted (S14). The visible range calculation unit 11 calculates the time (lane change time) to be spent for the lane change when calculating the target trajectory, and predicts and corrects the preceding vehicle area A3 after the lane change time on the basis of the inter-vehicle distance and the relative speed. In other words, "after the predetermined time" means "after the time required for changing the lane has elapsed from the current time".

The visible range calculation unit 11 calculates the visible range V2 by, for example, enlarging the preceding vehicle area A3, if the relative speed is negative, and increasing the degree of expansion of the preceding vehicle area A3 as the inter-vehicle distance is shorter.

Further, the visible range calculation unit 11 predicts the visible range V4 when the lane is changed after the predetermined time on the basis of the visible range V3 when the lane is changed (S15).

A method of calculating the target trajectory is described with reference to FIGS. 5 to 10. Note that, in the following, description is given about an example in which, assuming that the own vehicle 1 is a small vehicle and a small vehicle of the same size as the own vehicle 1 and a large vehicle whose front projection area is larger than that of the own vehicle 1 are traveling in front of the own vehicle 1.

The target trajectory calculation unit 12 calculates or acquires a front projection area (a projection area viewed right in front of the vehicle) of each preceding vehicle traveling on the parallel lane running parallel with the lane of the own vehicle 1 (S20).

The target trajectory calculation unit 12 sets an elapse of time (headway time) after the preceding vehicle passes a certain position until the own vehicle 1 passes the position according to the front projection area of the preceding vehicle (S31).

Figure 6:
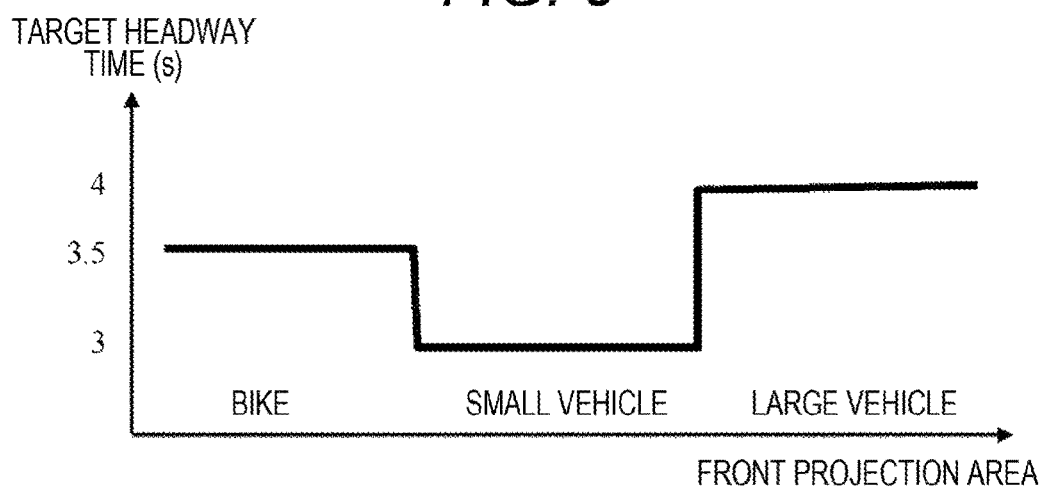
FIG. 6 is an explanatory diagram illustrating a method of setting target headway time.

FIG. 6 is an example of a method of setting a target headway time. As illustrated in FIG. 6, the target headway time is set according to the vehicle type or the projection area of the preceding vehicle. In the example of FIG. 6, the target headway time of a large vehicle is set longer than that for a small vehicle. Accordingly, when the preceding vehicle is a large vehicle, the inter-vehicle distance is longer than that of the small vehicle. As a result, it is possible to prevent occurrence of override caused by the own vehicle 1 approaching too close to the large vehicle.

As a reference headway time, 3 seconds is adopted here according to the standard for safe driving. Alternatively, the driver may increase or decrease the reference value of the vehicle headway time. A motorcycle (hereinafter referred to as a bike) has a small projection area and does not obstruct the field of vision of the driver of the own vehicle 1, but gives a psychological burden different from that of the small vehicle. Therefore, for the bike, it is preferable to set the target headway time irrespective of the size of the projection area. In the example of FIG. 6, by setting the target headway time of the bike to be larger than that of the small vehicle, the distance between the own vehicle 1 and the bike increases, and the own vehicle 1 is prevented from approaching the bike.

By referring to FIG. 5 again, the target trajectory calculation unit 12 determines whether the lane change is possible (S22). The determination method in step S22 is the same as the method described in connection with step S11 of FIG. 4, and the description thereof is not repeated here. If it is determined that the lane change is not possible (S22: NO), the process proceeds to step S27 which will be described later.

Upon determination that the lane change is possible (S22: YES), the target trajectory calculation unit 12 determines whether the results predicted in step S14 and step S15 in FIG. 4 are applicable (S23). That is, in step S23, it is determined whether the visible range V2 and the visible range V4 predicted in step S14 and step S15 of FIG. 4, respectively, can be used in this processing. In step S23, it is determined applicable when, for example, the difference, which is used in the prediction of the visible ranges V2 and V4, between the own vehicle speed and relative speed and the current own vehicle speed and relative speed falls within a predetermined range.

If the target trajectory calculation unit 12 determines that the predicted visible ranges V2 and V4 are applicable to the present processing (S23: YES), the process proceeds to step S24 which is described later. Meanwhile, if the target trajectory calculation unit 12 determines that the predicted visible ranges V2 and V4 are not applicable to the present processing (S23: NO), the process proceeds to step S25 which will be described later.

In step S24, the target trajectory calculation unit 12 urges the driver to proceed to step S26 to change the lane if the visible range V2 after the predetermined time from the current time (when the visible range V1 is calculated) is smaller than a psychological limit value Th which will be described later, and the visible range V4 after the predetermined time from the present time is larger than the psychological limit value Th, or otherwise urges the driver to proceed to step S27 to keep the current lane.

The case where the visible range V2 is lower than the psychological limit value Th is a case where the preceding vehicle area A3 occupies a large area of the area A2 corresponding to the field of vision of the driver. In this case, the driver feels a psychological burden because it is difficult for the driver to grasp the situation ahead.

On the other hand, the case where the visible range V4 after the elapse of the predetermined time when the lane is changed is larger than the psychological limit value Th is a case where the preceding vehicle area A3 occupies a small area of the area A2 corresponding to the field of vision of the vehicle. In this case, it is easy for the driver to visually recognize the situation ahead, and the psychological burden is considered to be decreased. However, even if the visible range is wide, the psychological burden of the driver may increase when the bike is traveling ahead. Therefore, in the present embodiment, the correction amount of the target headway time and the psychological limit value can be adjusted according to the vehicle type (and/or the size of the preceding vehicle area A3).

The psychological limit value Th can be obtained by, for example, repeatedly carrying out experiments for measuring a heart rate, a blood pressure, line-of-sight movement, and the like of the driver in a case where the driver is made to watch images of driving in various traffic environments. The psychological limit value Th may be a fixed value set in advance in the vehicle control device 10, or may be changed later.

In step S25, the target trajectory calculation unit 12 proceeds to step S26 when the visible range V1 is smaller than the psychological limit value Th and the visible range V3 is larger than the psychological limit value Th, and otherwise proceeds to step S27. The case where the visible range V1 is smaller than the psychological limit value Th is a case where it is difficult for the driver to visually recognize the situation ahead and the psychological burden is increased as described above. The case where the visible range V3 is larger than the psychological limit value Th is a case where the driver can easily see the situation ahead and the psychological burden is small.

In step S26, the target trajectory calculation unit 12 calculates a track for changing the lane, and presents the calculated target trajectory to the driver through the display device 109. When the vehicle control device 10 is in the driving assist mode, the calculated target trajectory for changing the lane is presented on the display device 109. On the other hand, when the vehicle control device 10 is in the automatic driving mode, the driver is notified of the lane change through the display device 109, and other surrounding vehicles are also notified of through the communication device 105, the blinker, and the like.

In step S27, the target trajectory calculation unit 12 urges the driver to keep the current-travel lane. When the vehicle control device 10 is in the driving assist mode, the display device 109 notifies the driver to keep the current lane. When the vehicle control device 10 is in the automatic driving mode, the lane keeping policy is notified to other vehicles nearby via the communication device 105.

Figure 7:
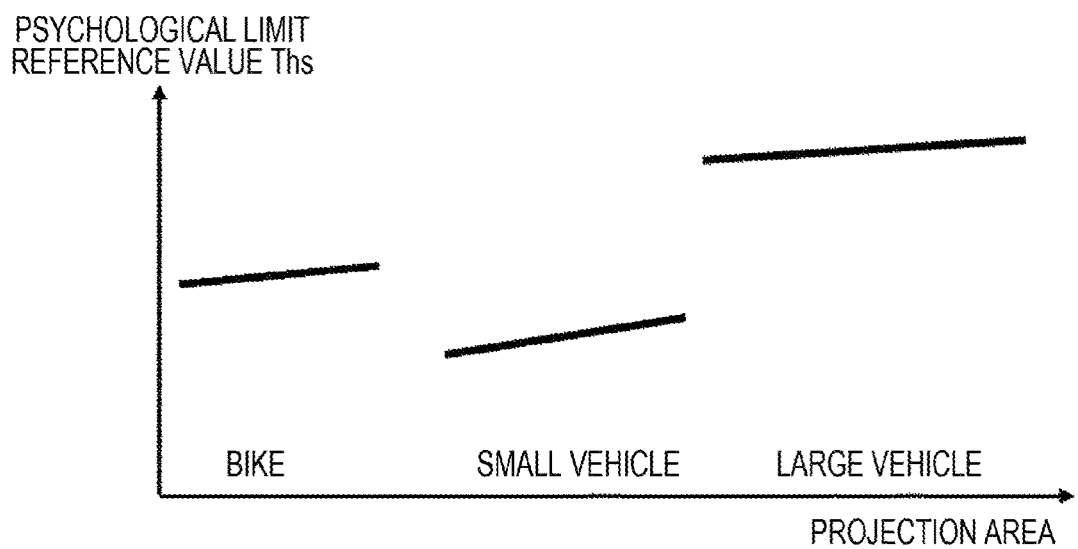
FIG. 7 is an explanatory diagram illustrating a method of calculating a psychological limit value according to a projection area (or vehicle type) of a preceding vehicle.

FIG. 7 is an example of a method of calculating the psychological limit value. In the present embodiment, a threshold value at which the driver feels uneasy with respect to the visible range V corresponding to the driver is defined as a psychological limit value (Th). It is defined that the driver feels uneasy when the visible range V falls below the psychological limit value Th. In the present embodiment, the lane change is assisted so as not to increase the uneasiness of the driver. In the present embodiment, a value obtained by accumulating the own vehicle speed correction and the relative speed correction with respect to the reference value Ths of the psychological limit value is used as the psychological limit value Th.

The reference value Ths of the psychological limit value can be set according to the vehicle type (and/or the projection area (preceding vehicle area A3)). Here, a large vehicle typically has a longer vehicle length than a small vehicle and also has a larger preceding vehicle area A3 that defines the visible range V. Therefore, in the present embodiment, the psychological limit reference value Ths is set on the basis of the projection area of the preceding vehicle. In the case of the large vehicle, the reference value Ths is set larger than that for the small vehicle. By setting a large psychological limit reference value Ths for the large vehicle, when the preceding vehicle is the large vehicle, the lane change is assisted at earlier timing than in the case of the small vehicle.

In the case of the bike when the vehicle moves faster than the own vehicle 1, the inter-vehicle distance increases with the elapse of time, so that the lane change is not necessary. On the other hand, when a low-speed bike is traveling in front of the own vehicle 1, there may be a sudden course change, it may be better changing the lane early. Therefore, in FIG. 7, the psychological limit reference value Ths is set higher for the bike than for the small vehicle and set lower for the bike than for the large vehicle.

Figure 8:
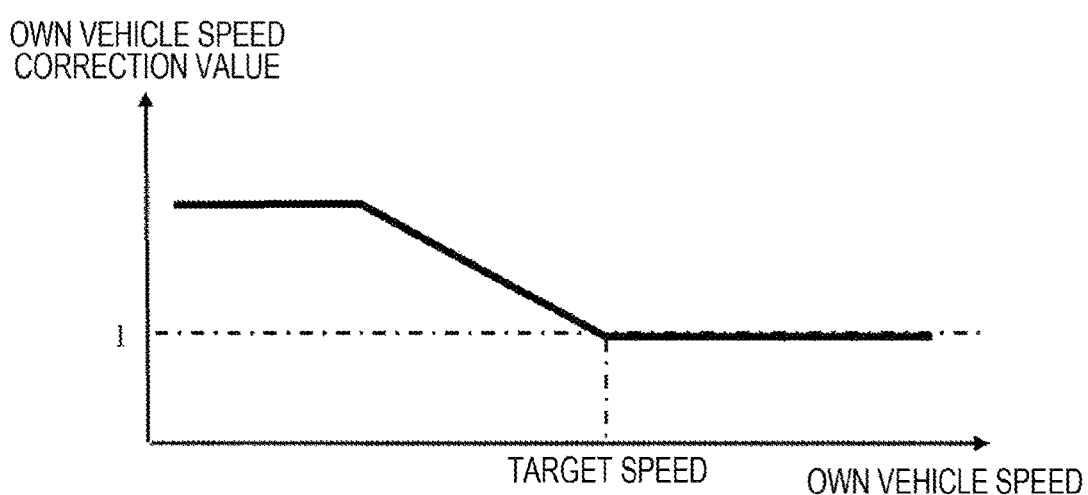
FIG. 8 is an explanatory diagram illustrating a method of correcting the psychological limit value according to a difference between an own vehicle speed and a target speed.

FIG. 8 illustrates an example of a method of correcting the psychological limit reference value Ths according to the speed of the own vehicle 1 (own vehicle speed).

In the present embodiment, when the own vehicle speed does not reach the target speed, the psychological limit reference value Ths is corrected to be increased. That is, the correction value multiplied by the psychological limit reference value Ths is set higher than "1" until the vehicle speed reaches the target speed. As the vehicle speed approaches the target speed, the correction value decreases toward "1". The target speed is set by the driver. When the vehicle speed reaches the target speed, the correction value changes to "1". That is, the correction of the psychological limit reference value Ths according to the vehicle speed of the own vehicle is stopped.

As illustrated in FIG. 8, by correcting in such a manner that the psychological limit reference value Ths increases until the own vehicle speed matches the target speed, a desire of the driver to reach the destination early can be satisfied early. That is, when a desire of the driver to reach the destination early exceeds the unease caused by the blocking the field of vision by the preceding vehicle, the psychological limit reference value Ths is corrected as illustrated in FIG. 8. Note that the correction value is not limited to the example of FIG. 8, and may be changed, for example, in a curved shape.

Figure 9:
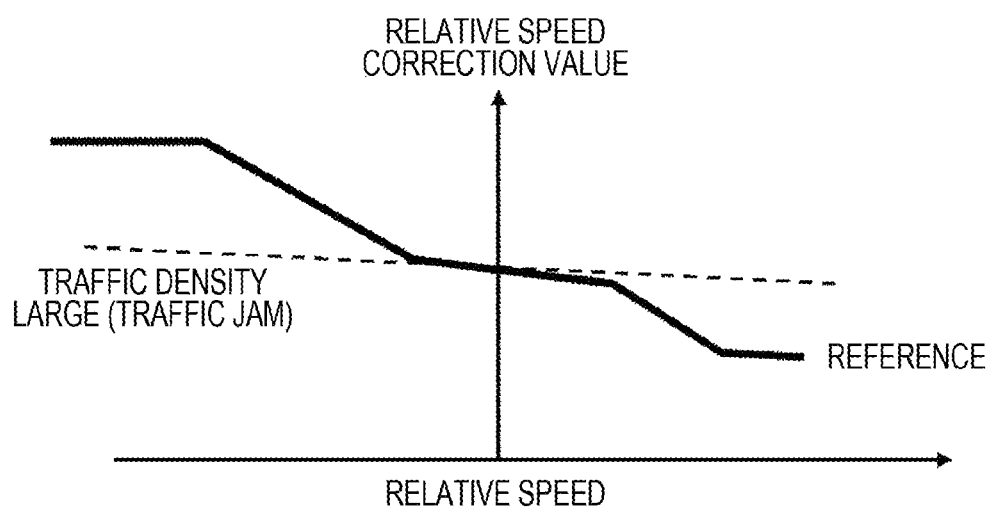
FIG. 9 is an explanatory diagram illustrating a method of correcting the psychological limit value according to a relative speed difference between the own vehicle and a preceding vehicle, and a method of limiting an amount of the correction according to a traffic density around the own vehicle.

FIG. 9 illustrates an example of a method of correcting the psychological limit reference value Ths according to the relative speed between the own vehicle 1 and the preceding vehicle. Description is given with reference to a correction value in which the relative speed is almost zero.

When the relative speed is a negative value, the speed of the preceding vehicle is slower than the own vehicle speed, and the inter-vehicle distance from the own vehicle 1 decreases over time. In this case, the psychological limit reference value Ths is set to be larger than the reference.

On the other hand, when the relative speed is a positive value, the speed of the preceding vehicle is faster than the own vehicle speed, and the inter-vehicle distance from the own vehicle 1 increases over time. In this case, the psychological limit reference value Ths is set to be smaller than the reference.

In the present embodiment, with reference to the case where the relative speed between the preceding vehicle and the own vehicle 1 is near zero, keeping the current speed is prompted when the relative speed is positive (when the preceding vehicle moves away), and the lane change is prompted when the relative speed is negative (when the preceding vehicle is approaching).

Note that, as indicated by the dotted line in FIG. 9, when the traffic density is larger than a preset traffic density reference value, it is preferable to decrease the correction according to the relative speed. The case where the traffic density is larger than the traffic density reference value is, for example, a case where traffic jam has occurred. If the lane is changed unnecessarily during the traffic jam, the visible range would not improve and the traffic jam would be even worse. Therefore, the correction by the relative speed is prevented during the traffic jam.

Figure 10:
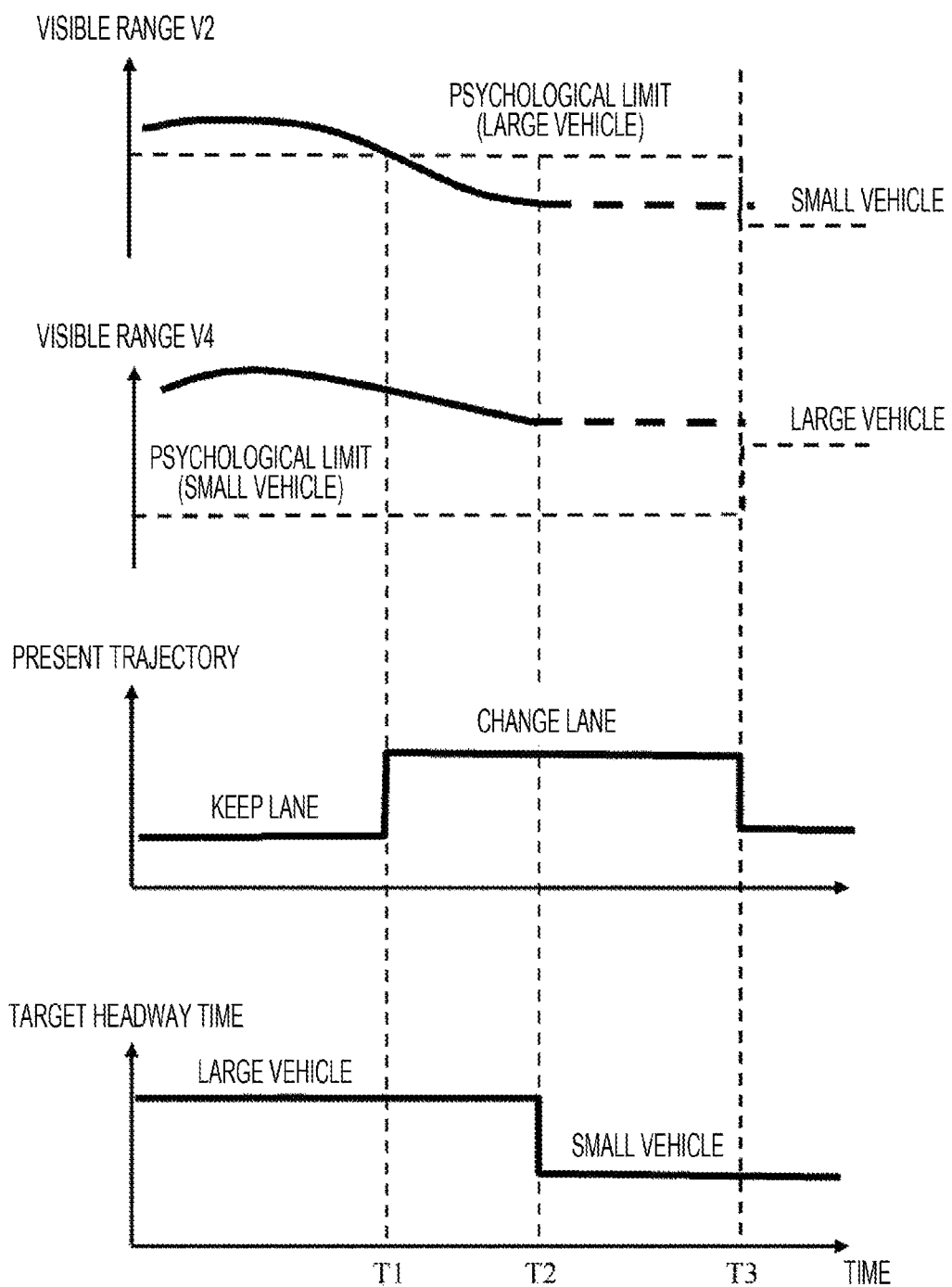
FIG. 10 is a time chart in changing lanes.

FIG. 10 is an example of a time chart of the lane change control. Here, how the trajectory of lane change is presented is described in a case where the preceding vehicle traveling ahead in the own vehicle lane is the large vehicle and the preceding vehicle traveling in a parallel lane adjacent to the own vehicle lane is the small vehicle. Note that, in the following description, it is assumed that the traveling of each preceding vehicle is predictable and the lane change of the own vehicle 1 is possible.

Assume that, at time T1, the visible range V2 is below the psychological limit value (large vehicle), while the visible range V4 is above the psychological limit (small vehicle). In this case, the target trajectory calculation unit 12 calculates a trajectory for the lane change and presents the trajectory to the driver via the display device 109.

When the driver approves the presented trajectory information, the driver, for example, touches the display device 109 or expresses approval by voice for voice recognition to give a permission trigger to the vehicle control device 10.

At the same time as giving the permission trigger, the driver starts the lane change at time T2. The driver switches the target headway time from the set value for the large vehicle to the set value for the small vehicle. The target headway time may be switched automatically.

Note that, during the lane change, it is preferable to interrupt the calculation of the visible range and maintain the previous value. This prevents cancellation of the lane change halfway.

Time T3 is the time when the lane change is completed. When the lane change is completed, the target trajectory calculation unit 12 stops presenting the lane change trajectory to the driver and sets the psychological limit value again according to the preceding vehicle (small vehicle) after the lane change. Then, the visible range calculation unit 11 resumes the calculation of the visible range.

In the present embodiment, after the vehicle control device 10 presents the lane change trajectory to the driver, the transition to the lane change control starts by giving the permission trigger by the driver, but the permission trigger may also be initiated by the driver by not giving a cancel command for a certain period of time.

As described above in detail, the lane change of the vehicle can be assisted, while the uneasiness of the driver is reduced, according to the present embodiment. In particular, according to the present embodiment, the field of vision (visible range) of the driver can be securely provided according to the driving situation, whereby the uneasiness of the driver can be reduced and the lane change assist is performed. Since the uneasiness of the driver can be reduced, the possibility of cancelling the driving assist mode or the automatic driving mode by override or the like is reduced, whereby the vehicle control device that is more convenient for the driver can be achieved.

Second Embodiment

A second embodiment is described with reference to FIGS. 11 and 12. Since the present embodiment corresponds to a modification of the first embodiment, the description will focus on differences from the first embodiment. The present embodiment describes a learning method when the lane change presented by the vehicle control device 10 is canceled or overridden during execution of the driving assist mode or automatic driving mode.

Figure 11:
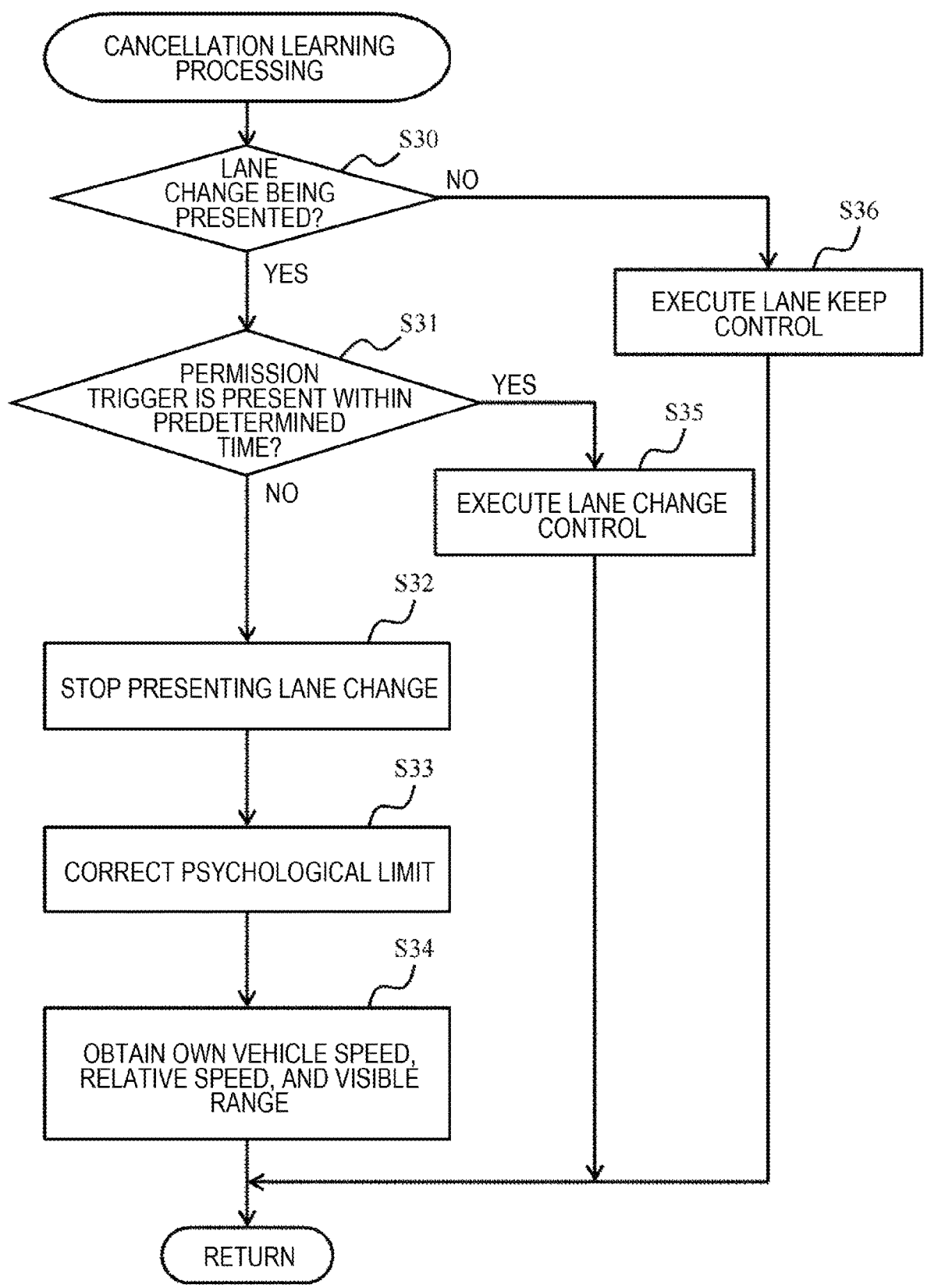
FIG. 11 is a flowchart illustrating cancellation learning processing for correcting the psychological limit value when the driver cancels the presentation of the lane change according to the second embodiment.

FIG. 11 is an example of a flowchart illustrating learning processing when the lane change is canceled halfway.

The vehicle control device 10 determines whether the lane change is presented to the driver in the driving assist mode (S30). If presented (S30: YES), the process proceeds to step S31. If not presented (S30: NO), the process proceeds to step S36 to control to keep the current lane.

In step S31, the vehicle control device 10 determines whether the permission trigger is input from the driver within predetermined time after the lane change trajectory is presented to the driver. When the permission trigger is input (S31: YES), the process proceeds to step S32, and the control for assisting the lane change is executed.

When the driver does not input the permission trigger within the predetermined time (S31: NO), the process proceeds to step S32 to stop presenting the lane change trajectory. Further, the vehicle control device 10 corrects the psychological limit value so that the trajectory for changing the lane is presented less frequently after the next time on, thus preventing the occurrence of cancellation during the lane change (S33). If the psychological limit value is corrected to a smaller value, the possibility that the visible range V is lower than the psychological limit value Th can be reduced, and the chance of presenting the lane change guidance can be reduced. When canceled (S31: NO), the psychological limit value may be corrected to be one-step lowered, or the psychological limit value may be corrected from the outside using the communication device 105.

In step S34, the vehicle control device 10 acquires the own vehicle speed, the relative speed, and the values of the visible ranges V1 to V4. The vehicle control device 10 uses these values for the correction of psychological limit values from the next time on or transmits the values to vehicles nearby via the communication device 105, thus allowing the assistance of the lane change using the psychological limit value suitable for the situation of the driver and the situation of the traffic.

Figure 12:
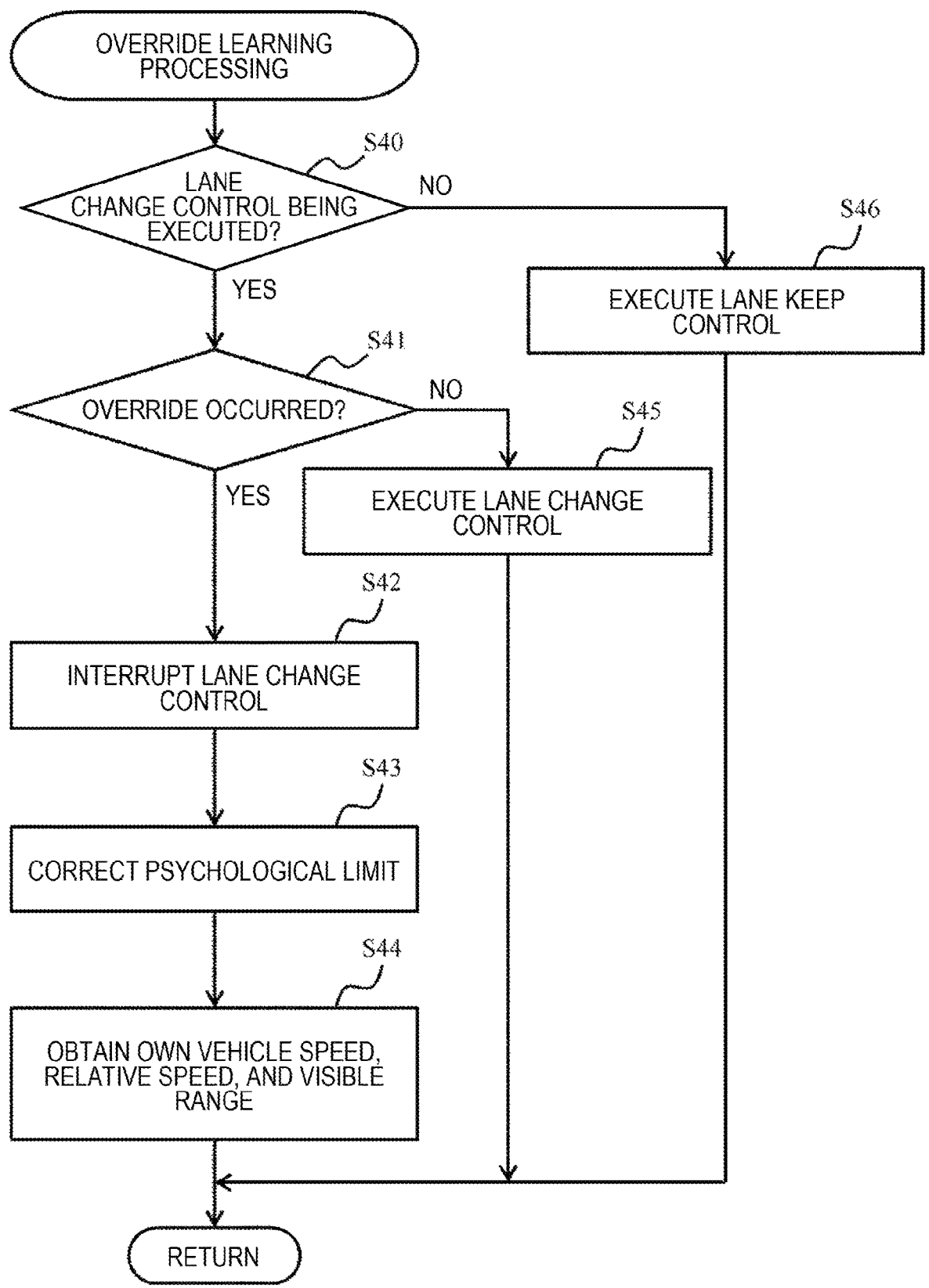
FIG. 12 is a flowchart illustrating override learning processing for correcting the psychological limit value when the driver overrides during automatic lane change.

FIG. 12 is an example of a flowchart illustrating learning processing during override. The vehicle control device 10 determines whether the lane change control is in execution (S40). If the lane change control is not in execution (S40: NO), the vehicle control device 10 executes control to keep the current lane (S46).

If the lane change control is in execution (S40: YES), the process proceeds to step S41. In step S41, it is determined whether the driver has operated the steering wheel or the brake to cause override. If no override has occurred (S41: NO), the lane change control is executed (S45).

When the override occurs (S41: YES), the vehicle control device 10 interrupts the lane change control and shifts to vehicle control in response to the operation of the steering wheel by the driver (S42). Further, the vehicle control device 10 corrects the psychological limit value to prevent the occurrence of override during the control of the lane change (S43). The correction value may be acquired from an external computer via the communication device 105, or may be automatically corrected so that the psychological limit value becomes small.

The vehicle control device 10 stores the own vehicle speed, the relative speed, and the visible ranges V1 to V4 at the time of overriding (S44). The vehicle control device 10 uses these values for correcting the psychological limit value or transmits these values to the vehicles nearby via the communication device 105 to automatically perform the lane change by using the psychological limit value suitable for the situation of the driver and the situation of the traffic.

The present embodiment configured in this way also achieves the same effects as the first embodiment. Further, according to the present embodiment, the psychological limit value can be corrected so as to correspond not only to the traffic situation but also to the situation of the driver. As a result, the safe feeling toward and the usability of the vehicle control device 10 can be further improved.

Note that the above description is merely an example, and when interpreting the invention, there is no limitation or restriction on the correspondence between the items described in the above embodiment and the items recited in the appended claims.

In addition, each constituent element of the present invention can arbitrarily be selected and sorted, and the invention having a configuration which is selected and sorted is also included in the present invention. Further, the configurations described in the appended claims can be combined with any combination besides those specified in the appended claims.

REFERENCE SIGNS LIST 1 vehicle
10 vehicle control device 11 visible range calculation unit
12 target trajectory calculation unit
13 acceleration/deceleration control command value calculation unit
14 steering command value calculation unit
15 communication display information calculation unit
100 windshield
101 steering wheel
103 room mirror
104 camera
105 communication device

The invention claimed is:

1. A vehicle control device that assists a lane change of a vehicle, comprising:
a visible range calculation unit that calculates an area as a visible range by excluding an area occupied by a preceding vehicle from an area corresponding to a field of vision during driving; and
a lane-change control unit that executes processing related to the lane change in accordance with the calculated visible range, wherein
the lane-change control unit executes processing related to the lane change in accordance with the visible range of a current-travel lane and the visible range of an intended change-destination lane; and
wherein:
the visible range calculation unit is configured to calculate the visible range of the current-travel lane, the visible range of the intended change-destination lane, the visible range after the predetermined time of the current-travel lane, and the visible range after the predetermined time of the intended change-destination lane; and
the lane-change control unit is configured to:
determine whether the lane change from the current-travel lane of the vehicle to the intended change-destination lane is possible;
present a driver with information for keeping the current-travel lane, when it is determined that the lane change is impossible, as the processing related to the lane change;
determine, when it is determined that the lane change is possible, whether it is possible to use the visible range after the predetermined time of the current-travel lane and the visible range after the predetermined time of the intended change-destination lane;
present the driver with information for changing the current-travel lane to the intended change-destination lane, as the processing related to the lane change, when it is determined that it is possible to use the visible range after the predetermined time of the current-travel lane and the visible range after the predetermined time of the intended change-destination lane, in a case where it is determined that the visible range after the predetermined time of the current-travel lane is smaller than a predetermined reference value set in advance and the visible range after the predetermined time of the intended change-destination lane is greater than the predetermined reference value; and
present the driver with the information for changing the current-travel lane to the intended change-destination lane, as the processing related to the lane change, when it is determined that it is impossible to use the visible range after the predetermined time of the current-travel lane and the visible range after the predetermined time of the intended change-destination lane, in a case where it is determined that the visible range of the current-travel lane is smaller than a predetermined reference value set in advance and the visible range of the intended change-destination lane is greater than the predetermined reference value.

2. The vehicle control device according to claim 1, wherein
the visible range calculation unit calculates the visible range of the current-travel lane and the visible range of the intended change-destination lane, and
when it is determined that the visible range of the current-travel lane is smaller than a predetermined reference value set in advance and the visible range of the intended change-destination lane is larger than the predetermined reference value, the lane-change control unit presents a driver with information for changing the current-travel lane to the intended change-destination lane as the processing related to the lane change.

3. The vehicle control device according to claim 2, wherein the information for changing the current-travel lane to the intended change-destination lane includes information for presenting the driver with a target trajectory for changing the current-travel lane to the intended change-destination lane.

4. The vehicle control device according to claim 3, wherein when an approval from the driver for the target trajectory is not obtained, the lane-change control unit corrects the predetermined reference value.

5. The vehicle control device according to claim 3, wherein
when information indicating approval of the target trajectory by the driver is generated, the lane-change control unit performs automatic lane change from the current-travel lane to the intended change-destination lane.

6. The vehicle control device according to claim 5, wherein when the automatic lane change from the current-travel lane to the intended change-destination lane is canceled by the driver, the lane-change control unit corrects the predetermined reference value.

7. The vehicle control device according to claim 5, wherein
the visible range calculation unit interrupts the calculation of the visible range and retains a previous value while the automatic lane change is being executed.

8. The vehicle control device according to claim 2, wherein
the predetermined reference value is corrected in accordance with at least one of an own vehicle speed of the vehicle, a relative speed between the own vehicle speed and the speed of the preceding vehicle, a surrounding traffic density, and an area occupied by the preceding vehicle in an area corresponding to the field of vision during driving.

9. The vehicle control device according to claim 1, wherein
the visible range calculation unit calculates a visible range after a predetermined time of the current-travel lane and a visible range after the predetermined time of the intended change-destination lane, and
when it is determined that the visible range after the predetermined time of the current-travel lane is smaller than a predetermined reference value set in advance and the visible range after the predetermined time of the intended change-destination lane is larger than the predetermined reference value, the lane-change control unit presents a driver with information for changing the current-travel lane to the intended change-destination lane as the processing related to the lane change.

10. The vehicle control device according to claim 1, further comprising a target trajectory calculation unit, wherein the target trajectory unit is configured to calculate a target trajectory of the vehicle.

11. The vehicle control device according to claim 1, wherein the predetermined reference value is a psychological limit value.

12. The vehicle control device according to claim 11, wherein the psychological limit value is corrected based on at least one of a traffic situation or a driver situation.

* * * * *